Nov. 17, 1970 W. DILLENBURGER 3,541,237

CONTROL ARRANGEMENT FOR COLOR TELEVISION

Filed Oct. 18, 1967 2 Sheets-Sheet 1

Inventor:
Wolfgang Dillenburger by Michael S. Striker

Attorney

Inventor:
Wolfgang Dillenburger
by Michael S. Striker
Attorney

United States Patent Office 3,541,237

Patented Nov. 17, 1970

3,541,237

CONTROL ARRANGEMENT FOR COLOR TELEVISION

Wolfgang Dillenburger, Niederramstadt, near Darmstadt, Germany, assignor to Fernseh GmbH, Darmstadt, Germany Filed Oct. 18, 1967, Ser. No. 676,194
Claims priority, application Germany, Oct. 19, 1966, F 50,480
Int. Cl. H04n *9/48;* G11b *5/44*
U.S. Cl. 178—5.4 10 Claims

ABSTRACT OF THE DISCLOSURE

An arrangement applicable to color television for automatically controlling the amplitude of the chrominance signal component in a color television signal when played back from magnetic tape. The color television signal is stored on the magnetic tape in tracks which are inclined to the longitudinal axis of the tape coinciding with the direction along which the tape moves translationally. The tape is scanned by a plurality of transducer heads mounted on a rotating head wheel at equal spaces from each other. The transducers convert the signals stored on the magnetic tape into corresponding transducer signal components which are transmitted by way of circuit paths connecting to the transducer heads. The amplitudes of the color synchronizing signals in all of the transducer signal components are averaged, and a signal is produced representing the mean or average value of the synchronizing signal. The resulting average value is then compared with the individual transducer signal components and a difference from this comparison process is established. The transmission characteristics of the circuit paths containing the transducer heads are then adjusted so as to maintain the difference realized from the comparison process, at a minimum.

BACKGROUND OF THE INVENTION

In an arrangement for the magnetic storage of television signals, as known in the art, the television signal is recorded upon magnetic tape in the form of inclined or transverse tracks through the use of magnetic recording heads carried on the circumference of a rotating head wheel. As a rule, the television signal is modulated upon a carrier wave as a frequency modulated signal. During playback, the signal components read from the individual tracks are combined into a continuous signal by means of an electronic switch synchronized with the rotation of the head wheel. When a carrier frequency signal is recorded, this combined signal is demodulated to recover the television signal. In one embodiment of this arrangement known in the art, four transducer heads are provided and mounted about the circumference of the head wheel so that they are equally spaced from each other. Each of the transverse tracks traversed in succession by the four magnetic heads contain a plurality of line periods of the television signals. Thus, there may, for example, be seventeen line periods present. Accordingly, the television image reproduced from the stored television signal is composed of a number of groups of lines. In the situation being considered, there are four such groups originating from the four heads of the equipment.

In a practical situation involving the magnetic storage of television signals as described above, the individual transducer head being used will, in general, differ from each other in respect to their amplitude and frequency characteristics. This problem is unavoidable. Accordingly, adjustable equalizer devices are provided for the purpose of equalizing the transmission characteristics of the individual signal paths. Thus, the equalizers are inclined in the signal path associated with the individual magnetic heads, and serve to equalize the gain and frequency characteristic of the signal paths. The equalization, however, may be achieved only within predetermined tolerances when this function is achieved through the adjustment of the equalizer devices. This is especially true when reproducing recordings made through the use of different apparatuses, or at difference times.

In the recording and playback of black and white television signals, the residual differences of the signal paths associated with the magnetic heads, result in differences in the resolution of fine picture details in the groups of lines reproduced by the individual magnetic heads. This is most apparent in the region of high video frequencies. Under usual conditions, however, these differences are not very apparent in the television picture.

When dealing with the magnetic storage of color television signals, however, this case is no longer true. In present day practice, the chrominance component of a color television signal is transmitted on a carrier frequency in the region of the higher video frequencies. In magnetic storage of color television signals, therefore, different amplitudes of the chrominance component in the signal path of the individual transducer heads result in a different color saturation in the line groups originating in different magnetic transducer heads. These differences are clearly visible and disturbing even when they are small.

Accordingly it is an object of the present invention to automatically equalize differences in the amplitudes of the color television signal components when taken from different transducer heads. This object pertains particularly to the high video frequency range in which the color subcarrier is transmitted. In this manner the differences in color saturation in the groups of lines derived from the individual magnetic heads are no longer visible in the color television picture, and a homogeneous color television picture is realized.

Present day color television signals include a color synchronizing component which consists of a train of oscillations at the color sub-carrier frequency. This train of oscillations is introduced into the back portion of the line blanking interval. The color synchronizing signal supplies a reference phase for demodulating the double-modulated carrier frequency chrominance signal. The correct reproduction of the two components of the chrominance signal for hue and saturation is thereby assured.

The color synchronizing signal is, furthermore, employed as a reference magnitude for the signal amplitude in the frequency range containing the color sub-carrier. Based on the assumption that the amplitude of the color synchronizing signal is constantly related to the maximum amplitude of the color television signal, as in the usual case, its amplitude is independent of the instantaneous value of the chrominance signal.

In this arrangement, the color synchronizing signal is separated from the signal components supplied by the individual transducer heads. The color synchronizing signal is then rectified to produce a DC voltage which is compared with a constant DC voltage. Thus, voltage comparisons of varying magnitudes are obtained in correspondence to the differences in amplitude of the color synchronizing signals in the individual signal paths. Equalizer devices in each signal path are controlled by means of these voltage differences so as to reduce the differences to a minimum. On the basis of the magnitude of the reference voltage, the amplitude of the color synchronizing signal and therefore the amplitude of the chrominance signal are controlled in all the signal paths so that they are maintained at the same value. The magnitude of the reference voltage, therefore, determines the amplitude of the chrominance signal and thereby the color saturation.

The amplitude of the reference voltage must therefore be selected so as to correspond to the nominal value of the amplitude of the color synchronizing signal component in the color television signal. If, therefore, the nominal value of the amplitude of the color synchronizing signal or the amplitude of the adjustable comparison voltage is altered, the amplitude of the chrominance signal is not controlled by the correct amount.

In accordance with the present invention, a circuit arrangement is provided for automatically controlling the amplitude of the chrominance signal component in a color television signal played back from a magnetic tape. The tape is scanned in tracks inclined to the length or axis of travel of the tape. The transducer heads which perform this scanning operation are carried upon a rotating head wheel. A control voltage is generated corresponding to the difference between the amplitude of the chrominance signal in the signal component produced by an individual transducer head, and the average value of the amplitudes of the color synchronizing signals in the signal components from all of the transducer heads. The control voltage is used to control the gain or the frequency response of the signal path in which the individual transducer head is situated, so as to reduce any difference in amplitude of the signal being compared.

Equalizing circuits or devices within the individual signal path of the transducer heads, may be controlled by the control voltage. The control voltage is, for this purpose, distributed to the individual signal paths by means of an electronic switch. The latter is synchronized with the switching of the signal paths or with the rotation of the transducer head wheel. It is, however, also possible to apply the control voltage to an equalizer device situated in the path of the television signal which is composed from the signal components taken from the individual transducer heads.

SUMMARY OF THE INVENTION

An arrangement for automatically controlling the amplitude of the chrominance signal in a color television signal. The television signal is stored on magnetic tape in tracks that are inclined with respect to the longitudinal axis directed parallel to the length of the tape. Transducer heads mounted on a rotating head wheel scan the tracks of the tape and provide transducer signal components along circuit paths. The transducer signal components are representative of the television signals being scanned. The transducer signal components are scanned; the amplitudes of the color synchronizing signals within all of the transducer signal components are averaged to determine an average or mean value of these amplitudes. This average value is then compared with the color synchronizing signals in the individual transducer signal components. The comparison provides a difference signal which is applied to a control arrangement for adjusting the frequency response of the individual circuit paths containing the transducers so as to reduce the difference to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
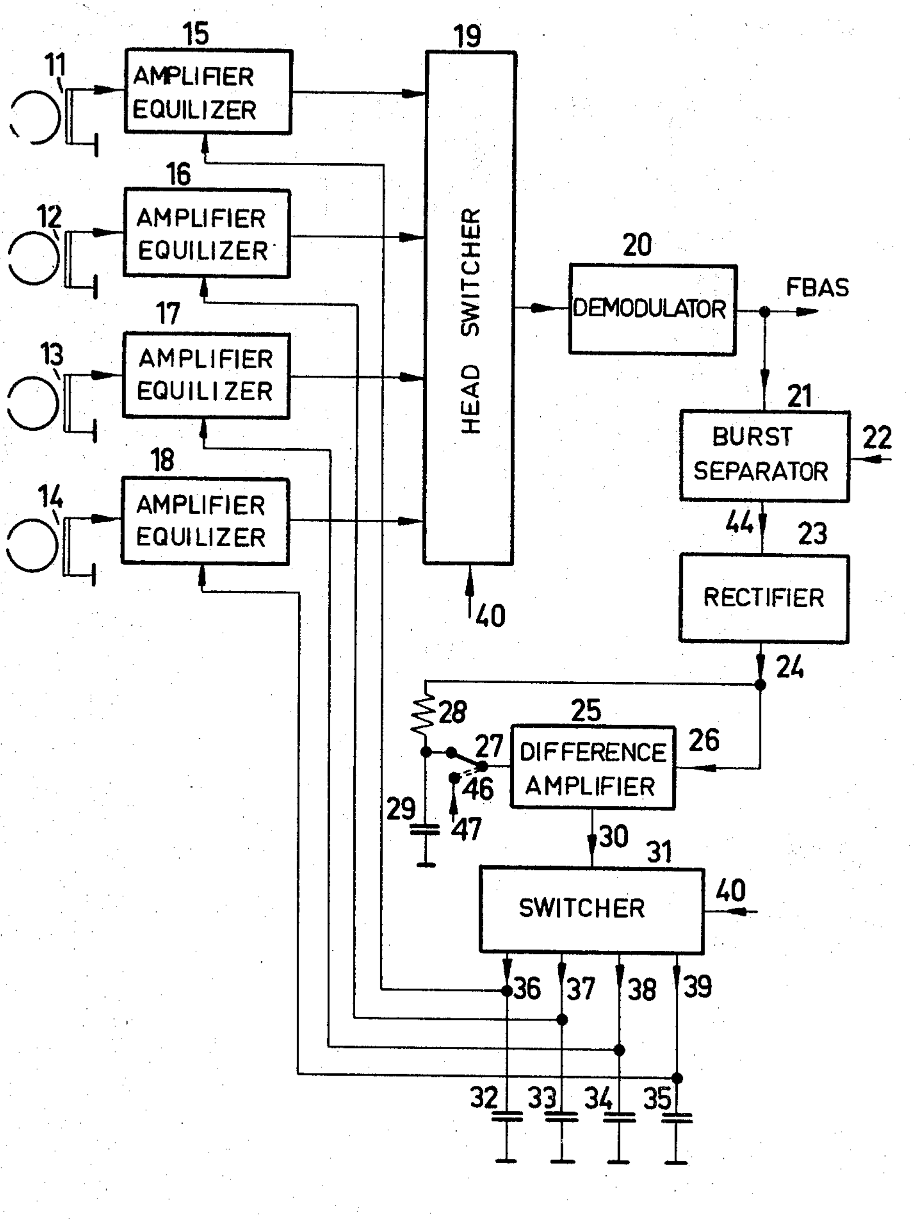
FIG. 1 is a schematic block diagram showing one embodiment of the arrangement, in accordance with the present invention, in which the controlling function is applied through the signal path or circuit path containing the individual transducer heads.

Referring to the drawing and in particular to FIG. 1, transducer heads for the magnetic storage of television signals are represented by the reference numerals 11, 12, 13 and 14. In practice, the transducer heads are distributed about the circumference of a head wheel past which the magnetic tape is traversed so that the heads scan the tape in tracks inclined to the longitudinal direction of the tape. The signals derived from the relative motion between the magnetic tape and the transducer heads 11 to 14, are transmitted to individual amplifiers 15, 16, 17 and 18, respectively. The amplifiers serve to amplify and equalize the signals sensed by the transducers. The equalizer devices for gain and frequency response are adjustable so that the signals may be made similar to each other from the viewpoint of gain and frequency response. The output signals of the amplifying devices 15, 16, 17 and 18 are applied to a transducer switching device 19. This switching device combines the signals from the amplifiers to produce a continuous television signal in the commonly known manner. For the purpose of performing its switching function, the transducer switching device 19 receives switching pulses at the input 40. These switching pulses are synchronous with the rotation of the head wheel. The output of the transducer switch 19 is applied to a demodulator 20 which, in turn, produces the video-frequency color television signal FBAS as derived from the carrier frequency signal.

The color synchronizing signal is separated from the color television signal FBAS in an extraction circuit 21. The circuit or device 21 contains an amplifier which is gated to be operative only during the existence of the color synchronizing signal in the color television signal. The separation process is accomplished by applying an impulse to the input 22. This impulse can be generated by a generator which is activated or initiated by the trailing edge of the horizontal synchronizing pulse contained in the television signal. The color synchronizing signal from the circuit 21 is then applied to a rectifier 23 which provides a DC voltage proportional to the amplitude of the color synchronizing signal. If the transmission characteristics of the signal paths associated with the transducer heads 11 to 14 differ, then the amplitudes of the color synchronizing signals will vary in value. Accordingly, the rectified voltage at the output 24 of the rectifier 23 will vary in value according to the signal path from which the color synchronizing signal is derived.

The rectified color synchronizing signal is then applied to a difference amplifier 25 in which it is compared to a reference voltage. This reference voltage corresponds to the mean or average value of the color synchronizing signals in all of the four signal paths. Thus, the output 24 of the rectifier 23 representing the rectified color synchronizing signal, is applied to an input 26 of the difference amplifier 25. The output from the rectifier 24 is, at the same time, applied to an integrating circuit comprised of the series combination of capacitor 29 and resistor 28. The signal appearing across this integrating circuit represents the average value of the output of the rectifier 23. This average value is then applied to the other input 27 of the difference amplifier 25. At the output 30 of the difference amplifier, therefore, appears a signal representing the difference between the instantaneous amplitude of the color television associated with the signal path being used, and the average value of all the color synchronizing signals.

The signal at the output of the difference amplifier 25 is applied as a control voltage to the four signal channels, by way of an electronic switch 31. The latter is controlled by means of pulse signals applied to it at the input 40. The electronic switch 31 has four outputs 36, 37, 38 and 39 connected to the amplifier and equalizer devices 15, 16, 17 and 18, respectively. Storage capacitors 32, 33, 34 and 35 are connected to the four outputs 36, 37, 38 and 39, respectively, to assure that controlling signals prevail during the interval when the electronic switch has interrupted the path from the difference amplifier to the devices 15, 16, 17 and 18. One electrode of the capacitors 32, 33, 34 and 35 is grounded.

It is convenient and desirable for the amplifier and equalizer devices 15 to 18 to include controllable frequency-response correctors. These correctors may, for example, be in the form of cosine correctors in which the degree of correction is adjustable by an applied control voltage. The amount of correction in the cosine corrector may be accomplished through a controlling resistance in the form of a photosensitive resistance. In this arrangement the latter is illuminated by a light source in which the intensity is varied by the applied control voltage.

A switch 46 allows the input 27 to the difference amplifier 25, to be connected to a constant adjustable voltage source 47. By altering this DC voltage, it is possible to alter or vary the amplitude of the chrominance signal and thus the color saturation in the reproduced color television picture. It is also possible to vary the relation between the rectified voltages in the individual signal paths and the average value.

Figures 2, 3:
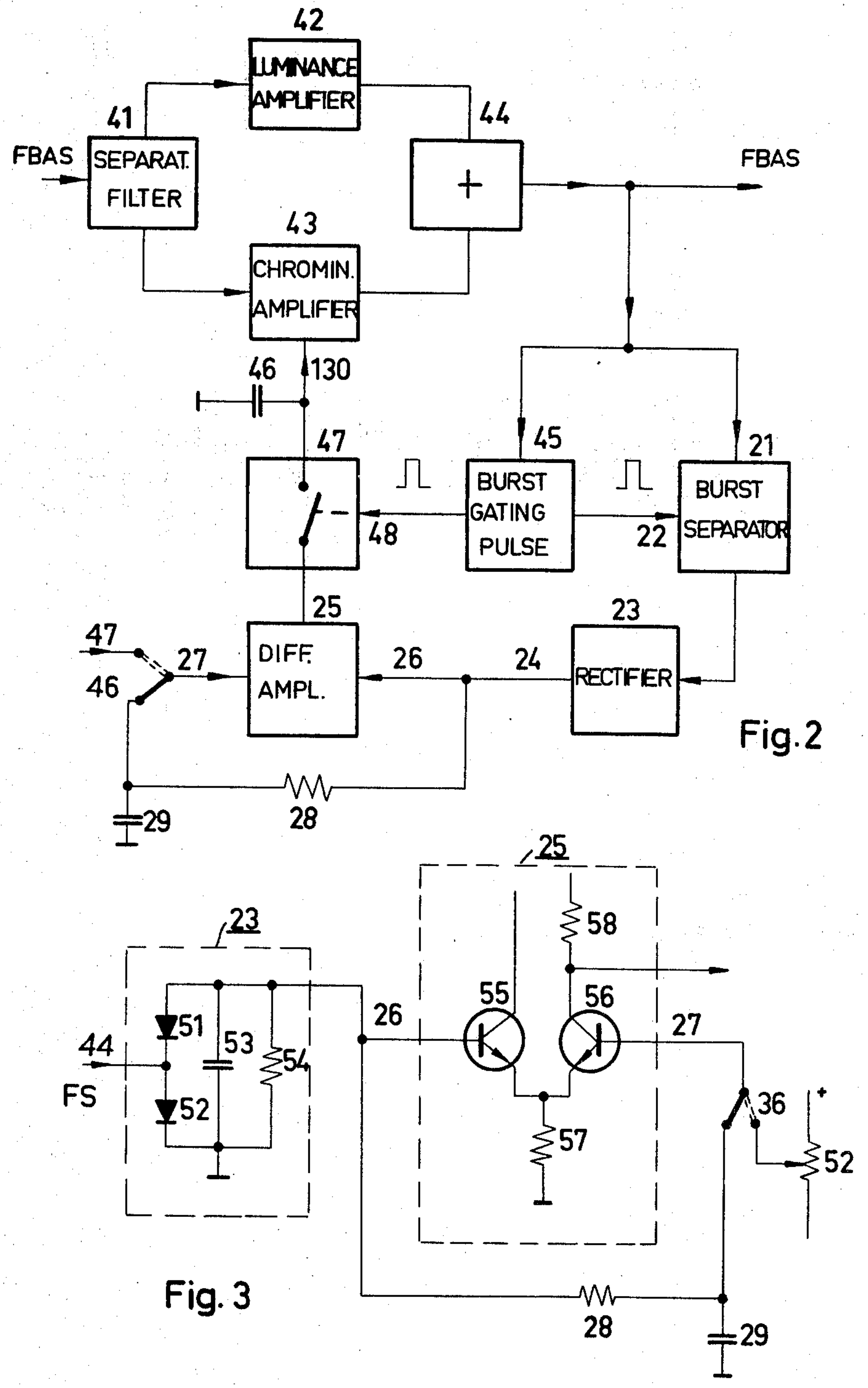
FIG. 2 is a schematic block diagram of an arrangement, in accordance with the present invention, in which the controlling function is achieved in a signal path through which is transmitted the color television signal composed of the signal components taken from the individual transducer heads.
FIG. 3 is a circuit diagram and shows a practical embodiment of portions of the arrangements shown in FIGS. 1 and 2.

Another embodiment of the present invention is illustrated in the block schematic diagram of FIG. 2. The signals derived by the individual transducer heads from the magnetic tape, are amplified in a manner similar to that described in relation to FIG. 1. These signals are then similarly combined into a continuous carrier frequency color television signal by means of a switch synchronized with the rotation of the head wheel. The continuous carrier frequency color television signal is then demodulated in order to derive the video frequency color television signal. The arrangement for performing this function is not shown in FIG. 2 since it corresponds precisely to that described for FIG. 1. By means of a frequency selection device 41, the video frequency color television signal FBAS is separated into a luminance component and a chrominance component. Each of the two signal components is amplified in a corresponding amplifier 42 and 43. The gain of the chrominance amplifier 43 is adjustable through the application of a control voltage at the input 130.

The outputs of the chrominance amplifier 43 and the brightness amplifier 42 are applied to a mixer 44 in which the two signals are added. The corrected color television signals FBAS is realized from the output of the mixer 44.

The corrected color television signal is applied to a gating stage 21 in which it is screened or filtered by means of a gating pulse applied to the input 22. The gating pulse is derived from a pulse generator 45 from the horizontal synchronizing pulses of a color television signal. The color synchronizing signal from the gate circuit 21 is applied to a rectifier 22 which transforms the signal into a corresponding D.C. voltage.

The rectified signal from the rectifier 23 is processed further in a manner similar to that described for FIG. 1. Thus, the rectified signal is applied to the input 26 of a difference amplifier 25 and, at the same time, to an averaging circuit comprised of the resistor 28 and capacitor 29. By means of the switch 36 the input 27 of the difference amplifier 25 may have applied to it either the average value of the rectified color synchronizing signal or a preferred adjustable D.C. voltage 37. The output of the difference amplifier 25 represents the difference between the rectified color synchronizing signal and the comparison signal which is applied to control the transmission characteristic of the chrominance amplifier 43. This is the amplifier through which the combined color television signal is transmitted.

Gain control of the chrominance amplifier 43 is carried out in the form of a gated gain control. Thus, the control voltage is applied to a storage device in the form of a capacitor 46. The latter is charged only when the control voltage pulse appears at the output of the difference amplifier 25 and remains effective upon the controlled amplifier 43 during the interval between successive control voltage pulses. An electronic switch 47 is included in the path of the control signal. The electronic switch 47 is closed during the presence of the control pulse, by means of a gating pulse. The latter is generated by the gating pulse generator 45 and is applied to the switch 47 at the input 48. The control amplifier may also contain a clamping circuit which may be pulsed during the presence of the control pulse. The control voltage from the difference amplifier 25 may also be applied to this clamping circuit.

In an alternate manner, the control voltage component as derived from the signals taken from the individual transducer heads, may be stored separately. Through the process similar to that described for FIG. 1, the rectified color synchronizing signal may be separated into control voltage components through the use of an electronic switch. These control voltage components can be stored in capacitors and then be combined again into a single control signal by means of synchronous electronic switches.

FIG. 3 shows an embodiment of a circuit showing the details of a rectifier 23 and the difference amplifier 25 as described in relation to FIGS. 1 and 2 supra. The input to the rectifier in the form of the color synchronizing signal FS is applied, by way of a lead 50, to two diodes 51 and 52. The two diodes are connected across a parallel combination of a capacitor 53 and resistor 54. Through the use of this arrangement a D.C. voltage corresponding approximately to the peak value of the color synchronizing signal FS, is realized. The D.C. voltage is applied to the input 26 of the difference amplifier 25. The difference amplifier is comprised of two transistors 55 and 56 having a common cathode resistor 57. The second input 27 of the difference amplifier is connected to the base of the transistor 56. When the position of the switch 36 is as shown by the solid lines in the drawing, the input 27 has applied to it the average value of the rectified color synchronizing signal. The voltage representing this average value of the rectified color synchronizing signal is produced by an integrating circuit comprising the series combinaton of resistor 28 and capacitor 29. The time constant of this RC combination is made sufficiently large to smooth out differences in the amplitude of the color synchronizing signal in the individual signal paths. When the switch 36 is in the position shown by the broken lines, the input 27 has applied to it an adjustable reference voltage realized from a potentiometer 52. Thus, the average value signal is replaced by an adjustable reference voltage. The potentiometer winding 52 is energized from a suitable D.C. voltage source.

It will be understood that each of the elements described above, or two or more together, may also find a useful application in other types of amplitude control circuits for color television signals differing from the types described above.

While the invention has been illustrated and described as embodied in an amplitude control circuit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for automatically controlling the amplitude of the chrominance signal in a color television signal played back from magnetic tape comprising, in combination, transducer means for scanning said magnetic tape along tracks inclined with respect to the axis directed parallel to the length of the tape and providing transducer signal components along circuit paths representative of the television signal scanned; averaging means for providing an average value as a function of time of the amplitudes of the color synchronizing signals in all of said transducer signal components from said transducer means; difference means for providing a difference signal representing the difference between said average value and the instantaneous amplitude of the color synchronizing signal in one of said transducer signal components; and control means controlled by said difference signal and adjusting the frequency response of said circuit paths of said transducer means so as to reduce the difference between said average value and the amplitude of the color synchronizing signal in said one transducer signal components.

2. The arrangement for automatically controlling the amplitude of the chrominance signal in a color television signal as defined in claim 1 including equalizing means connected within said circuit paths and actuated by said difference signal for adjusting the frequency response of said circuit paths associated with said transducer means.

3. The arrangement for automatically controlling the amplitude of the chrominance signal in a color television signal as defined in claim 1 including rectifying means for rectifying said difference signal for providing a DC voltage suitable for comparison.

4. An arrangement for automatically controlling the amplitude of the chrominance signal in a color television signal as defined in claim 1 including first rectifying means for rectifying said synchronizing signals in said transducer signal components; and second rectifying means for rectifying said average value provided by said averaging means, said difference means comparing the rectified signals from said first rectifying means and said second rectifying means for forming said difference signal.

5. An arrangement for automatically controlling the amplitude of the chrominance signal in a color television signal as defined in claim 4 including reference voltage supply means for supplying a reference voltage proportional to the average value rectified by said second rectifying means.

6. The arrangement for automatically controlling the amplitude of the chrominance signal in a color television signal as defined in claim 1 including rectifying means for rectifying the color signals in said transducer signal components provided by said transducer means; and adjustable reference voltage supply means, said difference signal being generated by said difference means through comparison of said color signal rectified by said rectifying means with the reference voltage supplied by said reference voltage supply means.

7. The arrangement for automatically controlling the amplitude of the chrominance signal in a color television signal as defined in claim 1 including equalizing means connected within said circuit path, and control voltage generating means for generating an individual control voltage component associated with an individual color synchronizing signal, said control voltage being applied to said equalizing means for adjusting the frequency response of said circuit path associated with said transducer means providing said individual color synchronizing signal.

8. An arrangement for automatically controlling the amplitude of the chrominance signal in a color television as defined in claim 1 including equalizing means through which the chrominance signal from all said transducer signal components is transmitted; and control voltage generating means for generating a fluctuating control voltage and applying the same to said equalizing means.

9. The arrangement for automatically controlling the amplitude of the chrominance signal in a color television signal as defined in claim 3 wherein said rectifying means comprises a plurality of series connected diodes; capacitor means connected in parallel with said plurality of series connected diodes; and resistor means connected in parallel with said capacitor means, the output of said rectifying means being at a junction of said resistor and capacitor means.

10. The arrangement for automatically controlling the amplitude of the chrominance signal in a color television signal as defined in claim 1 wherein said difference means comprises a transistor difference amplifier having a common emitter resistor.

References Cited

UNITED STATES PATENTS

| | | | |
|---|---|---|---|
| 3,272,915 | 9/1966 | Theriault. | |
| 3,381,083 | 4/1968 | Jensen et al. | 178—5.2 |

RICHARD MURRAY, Primary Examiner

J. C. MARTIN, Assistant Examiner

U.S. Cl. X.R.

179—100.2